Oct. 17, 1933.  F. J. BARNES  1,930,739
WEATHER WINDOW FOR AUTOMOBILES
Filed Feb. 24, 1932  2 Sheets-Sheet 2

Frederick J. Barnes
INVENTOR

BY Benjamin Webster
ATTORNEY

Patented Oct. 17, 1933

1,930,739

UNITED STATES PATENT OFFICE 1,930,739

WEATHER WINDOW FOR AUTOMOBILES

Frederick J. Barnes, Bellmore, N. Y.

Application February 24, 1932. Serial No. 594,793

2 Claims. (Cl. 296—44)

This invention relates to automobiles and more particularly to windows for automobiles.

The objects of the invention, among others, are: First, to provide a weather window for automobiles, as a separate unit, adapted to be secured in the opening, from which the fixed window has been lowered, in the door at the left of the driver's seat; second, to provide such a weather window with a small hinged door adapted to swing open to permit the extension of the driver's hand to signal; third, to provide such a weather window that may be folded in a compact package; and fourth, to provide such a window that may be locked from the inside. Other objects will appear as the description proceeds.

Figure 1:
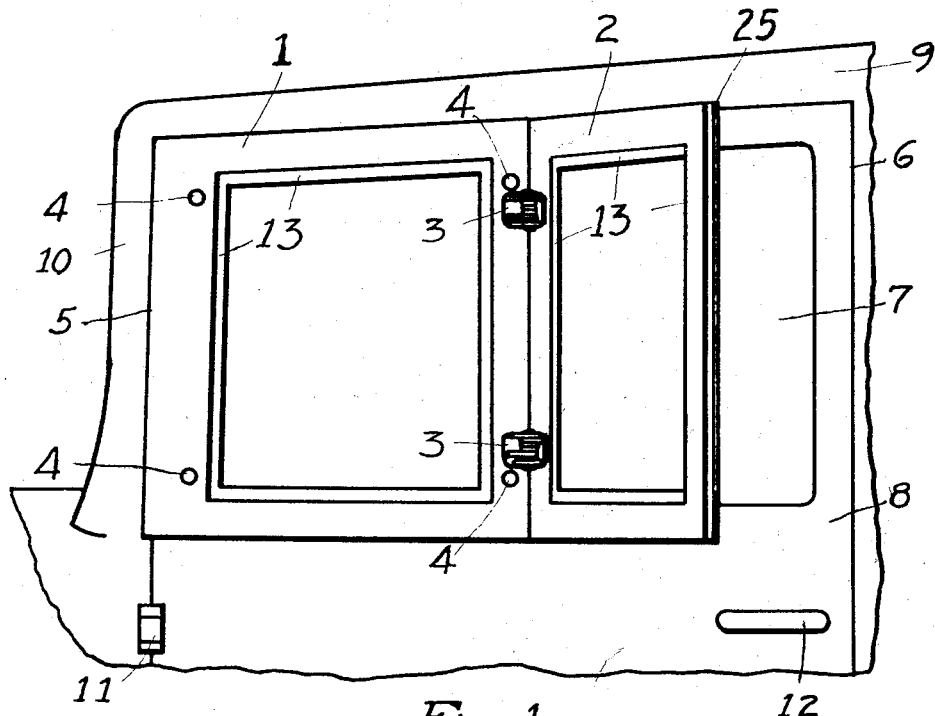
Figure 2:
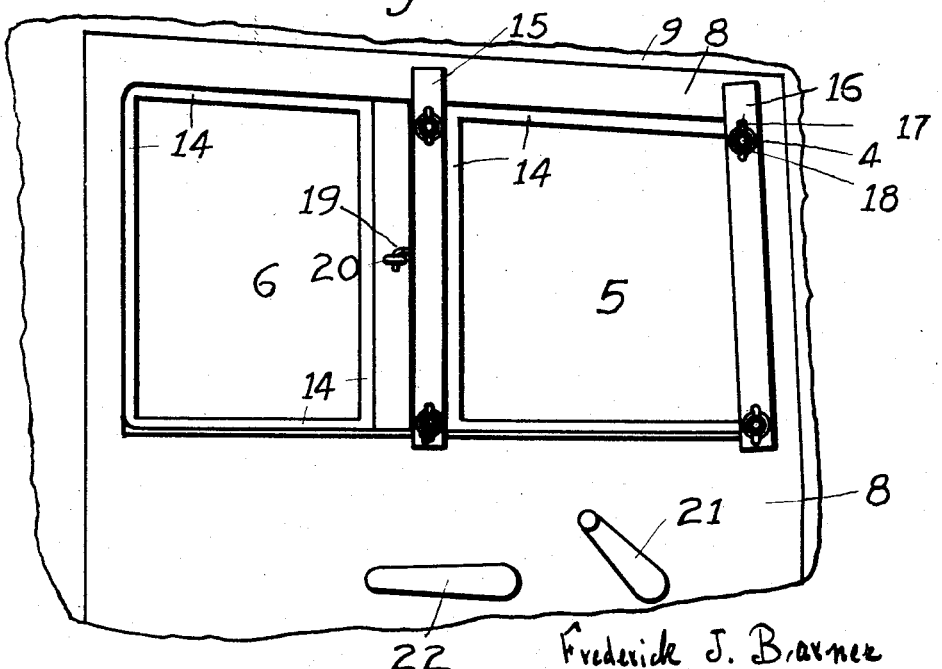
Figure 3:
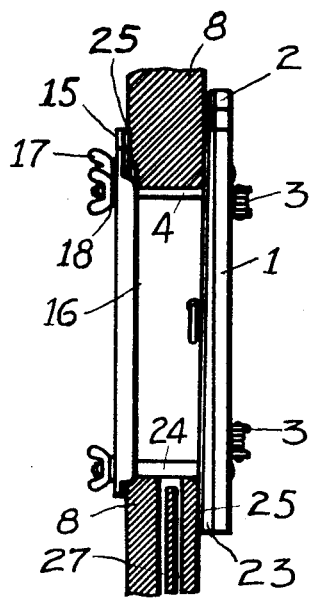
Figure 4:
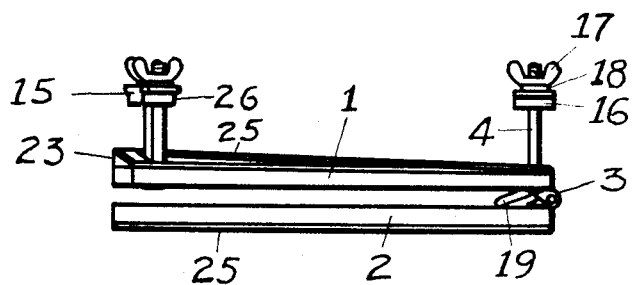
Figure 5:
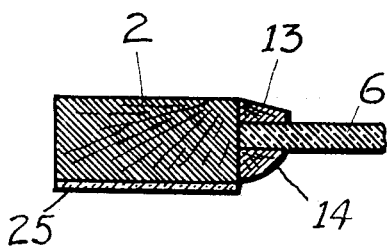

Reference is made to the drawings for an illustration of one embodiment of the invention, in which Fig. 1 is an elevation, viewed from outside the automobile, showing the weather window in operative position secured in the left front door, Fig. 2 is an elevation as viewed from the driver's seat of an automobile, Fig. 3 is an end view looking toward the rear in Fig. 1 with the automobile door in cross-section, Fig. 4 is a top view with the parts folded on their hinges but with the bolts in their operative position, and Fig. 5 is a transverse section through the frame of the hinged door of the weather window.

As shown in the drawings, the weather window consists of a front frame 1 and a rear frame 2, secured together by two coil-spring hinges 3, which exert tension tending to keep the two frames in the same vertical plane. Four bolts 4 are mounted in the frame 1, quickly detachable, and serve to support the weather window frame 1 with its glass pane 5 and secondarily the frame 2 with its glass pane 6 in the window opening 7, from which the regular glass 27 has been lowered, of the left front door 8 of an automobile, having a top 9 and front 10, to which a hinge 11 secures the door 8. When the door handle 12 is turned and the door 8 swung open or shut the weather window travels as a fixed unit with the door. Beading strips 13 and 14, beveled, rigidly secure the glass panes 5 and 6 in the frames 1 and 2, the strip 14 being so formed and inclined that it does not hinder the fingers or the hand as they move over and against the inside of the pane 6 and across the frame 2 in quickly extending the left hand to signal a driver at the rear. It is understood that the frames 1 and 2 overlie the door 8 on the outside around the opening 7 and that the bolts 4 carry on their inner ends clamps 15 and 16 which overlie the door 8 on the inside around the opening 7 and the weather window is secured in operative position by turning the wing nuts 17 against the washers 18. When the driver leaves the car or automobile parked he pushes the hook 19 into the eye 20 to lock the frame 2 against swinging open. The crank 21 and the handle 22 are the usual equipment of an automobile. The door 8 of the automobile is usually curved inwardly towards the front at the bottom of the opening 7 so therefore the bottom of the frame 1 of the weather window is formed with the inner curved surface 23 to snugly fit the door 8. To prevent scratching and to cushion the frame the two lower bolts 4 are covered with rubber 24 which rests on the lower edge of the opening 7. The entire periphery of the combined frames 1 and 2 has the inner edge covered with a rubber strip or cushion 25 which both prevents scratching the door and keeps out water and air. As shown in Fig. 4 at the left the end of the bracket 15 (or 16) is cutaway at 26 to fit the inside of the door and is also coated with rubber 25 or other cushioning or gripping material. As shown in Fig. 3 the glass pane 27 of the door 8 is in the lowermost position, and the weather window is substituted for it. The device is foldable as shown in Fig. 4 and by removing the wing nuts 17 and the washers 18, clamps 15 and 16 and bolts 4 may be removed so that the weather window may be packed compactly.

The utility of the device is now obvious. Thousands of automobile accidents are caused by the fact that the window 27 in the door 8 is kept closed in wet or cold weather, and therefore the driver can not and does not signal with his left hand to the driver at the rear. With my weather window in place however, the driver extends his hand in the usual way and the frame 2 or hinged door swings out towards the front, keeping the weather out of the car, and after signaling the frame 2 and glass 6 are returned to the closed position by the tension of the spring hinges 3. When the car is parked the weather window is easily locked by the hook 19 and eye 20 from the inside. By loosening the wing nuts the whole device is quickly removed and the bolts 4 also, making it foldable into a small compact package for inserting in a box or compartment.

Having now shown and described one embodiment of my invention, and realizing that many changes may be made in the details and sizes without departing from the spirit of my inven-

I claim,

1. A weather window for automobiles comprising in combintion a frame adapted to be secured over and in the opening of an automobile door, said frame comprising two vertically hinged sections, a clamp adapted to secure one section in the casing of the door opening after the window has been lowered in said door opening, and a spring tending to hold the other section in closed position against swinging.

2. A weather window for automobiles comprising in combination a frame adapted to be secured over and in the opening of an automobile door, said frame having the lower edge formed to fit snugly the curved door of an automobile, said frame comprising two sections, one of said sections being vertically hinged on the other section, each section comprising a glass window, a spring interacting with one of said sections when and if moved and adapted to return it to the initial position, a clamp secured to the other section of the frame, said clamp comprising detachable bolts and wing nuts whereby the weather window may be disassembled and packed in a compact unit.

FREDERICK J. BARNES.